US008259941B2

(12) United States Patent
Yanazume

(10) Patent No.: US 8,259,941 B2
(45) Date of Patent: Sep. 4, 2012

(54) IMAGE PROCESSOR, IMAGE PROCESSING METHOD, AND COMPUTER PROGRAM PRODUCT FOR STORING IMAGES AND RELATED CODE INFORMATION

(75) Inventor: Shinsuke Yanazume, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 912 days.

(21) Appl. No.: 12/219,608

(22) Filed: Jul. 24, 2008

(65) Prior Publication Data

US 2009/0034723 A1  Feb. 5, 2009

(30) Foreign Application Priority Data

Aug. 2, 2007  (JP) ................................. 2007-201492

(51) Int. Cl.
 *H04N 1/44* (2006.01)
 *G06K 7/10* (2006.01)
(52) U.S. Cl. .................................. 380/246; 235/462.1
(58) Field of Classification Search .................. 380/246; 235/362
 See application file for complete search history.

(56) References Cited

U.S. PATENT DOCUMENTS

| 5,321,749 | A | * | 6/1994 | Virga ............................ 380/243 |
| 5,357,094 | A | * | 10/1994 | Baldwin .................. 235/462.02 |
| 5,490,217 | A | * | 2/1996 | Wang et al. ...................... 380/51 |
| 5,541,993 | A | * | 7/1996 | Fan et al. ....................... 380/246 |
| 5,602,377 | A | * | 2/1997 | Beller et al. ............. 235/462.15 |
| 5,633,932 | A | * | 5/1997 | Davis et al. ................... 713/176 |
| 5,692,048 | A | * | 11/1997 | Gormish et al. .............. 380/246 |
| 5,764,774 | A | * | 6/1998 | Liu ................................ 380/269 |
| 5,841,978 | A | * | 11/1998 | Rhoads .......................... 709/217 |
| 5,862,270 | A | * | 1/1999 | Lopresti et al. ............... 382/306 |
| 6,827,279 | B2 | * | 12/2004 | Teraura ......................... 235/492 |
| 6,928,551 | B1 | * | 8/2005 | Lee et al. ....................... 713/165 |
| 7,315,946 | B1 | * | 1/2008 | Blumenfeld et al. .......... 713/175 |
| 7,639,820 | B2 | * | 12/2009 | Saito ............................. 380/287 |
| 7,664,486 | B2 | * | 2/2010 | Noguchi ....................... 455/411 |
| 7,766,241 | B2 | * | 8/2010 | Tomita ..................... 235/462.11 |
| 2003/0089770 | A1 | * | 5/2003 | Veeneman .................... 235/383 |
| 2003/0105721 | A1 | * | 6/2003 | Ginter et al. .................... 705/54 |
| 2004/0026511 | A1 | * | 2/2004 | Cheung et al. ............. 235/462.1 |
| 2004/0182930 | A1 | * | 9/2004 | Nojiri ....................... 235/462.04 |

(Continued)

FOREIGN PATENT DOCUMENTS

JP  11-243463  9/1999

(Continued)

OTHER PUBLICATIONS

WIPO Publication WO2006085584.*

(Continued)

*Primary Examiner* — Saleh Najjar
*Assistant Examiner* — Michael Chao
(74) *Attorney, Agent, or Firm* — Harness, Dickey & Pierce, P.L.C.

(57) ABSTRACT

In an MFP, an image on an original is read and the image is stored as a document (input image) in an HDD. A marking-information generation module generates marking information (two-dimensional code information) expressing at least one of information relating to storage of the document and an output parameters of the document. A document-relevance-information management module relates the marking information to the stored image, and an encryption/decryption module encrypts the marking information. A marking generation module generates a marking image from the encrypted marking information, and the marking image is printed out.

22 Claims, 15 Drawing Sheets

U.S. PATENT DOCUMENTS

| | | | |
|---|---|---|---|
| 2006/0000910 A1* | 1/2006 | Chong et al. | 235/462.15 |
| 2006/0190742 A1* | 8/2006 | Ebitani et al. | 713/193 |
| 2006/0244995 A1* | 11/2006 | Kushida | 358/1.15 |
| 2007/0007349 A1* | 1/2007 | Uchida et al. | 235/462.01 |
| 2007/0127085 A1* | 6/2007 | Mori | 358/403 |
| 2008/0049245 A1* | 2/2008 | Kamasuka et al. | 358/1.15 |
| 2009/0022314 A1* | 1/2009 | Wada et al. | 380/246 |

FOREIGN PATENT DOCUMENTS

| | | |
|---|---|---|
| JP | 2004-167831 | 6/2004 |
| JP | 2005-332401 | 12/2005 |
| JP | 2006-258898 | 9/2006 |
| JP | 2006-323688 | 11/2006 |
| JP | 2007-166439 | 6/2007 |

OTHER PUBLICATIONS

Japanese Office Action dated Nov. 1, 2011, for corresponding Japanese Application No. 2007-201492.

* cited by examiner

FIG. 5

| DOCUMENT INFORMATION | | | IMAGE INFORMATION | | OUTPUT CONDITION INFORMATION | | | ENCRYPTED MARKING INFORMATION | | DECRYPTION KEY |
|---|---|---|---|---|---|---|---|---|---|---|
| DOCUMENT NAME | STORAGE LOCATION | CREATOR | PAGE No. | IMAGE ID | PRINTING PAPER SIZE | INTEGRATION | ... | DOCUMENT & IMAGE & OUTPUT CONDITION INFORMATION | DEVICE INFORMATION | |
| DOC001 | MFP01/01 | USER 1 | 1 | 1003 | A4 | 2 IN 1 | | xxxxxx | MFP01 | xxxxx |
| | | | 2 | 1004 | | | | | | |
| DOC012 | MFP01/03 | USER 2 | 1 | 5041 | A4 | NONE | | xxxxxx | MFP01 | xxxxx |
| DOC231 | MFP02/03 | USER 4 | 1 | 4421 | A3 | NONE | | xxxxxx | MFP02 | xxxxx |

⇩ SPECIFY STORAGE DEVICE AND FOLDER

⇩ SPECIFY IMAGE DATA

IMAGE PROCESSOR, IMAGE PROCESSING METHOD, AND COMPUTER PROGRAM PRODUCT FOR STORING IMAGES AND RELATED CODE INFORMATION

CROSS-REFERENCE TO RELATED APPLICATIONS

The present application claims priority to and incorporates by reference the entire contents of Japanese priority document 2007-201492 filed in Japan on Aug. 2, 2007.

BACKGROUND OF THE INVENTION

1. Field of the Invention

The present invention relates to an image processor (hereinafter, also "device") such as an image forming apparatus (digital multi function peripheral, digital copying machine, fax machine, and printer), an image reader (scanner and the like), and a personal computer (PC).

2. Description of the Related Art

Japanese Patent Application Laid-open No. H11-243463, for example, discloses a digital multi function peripheral (MFP) that can store image data input from another device, such as the scanner or an external device, in a predetermined storage device, such as a hard disk drive (HDD) built in an own machine or externally connected thereto, and manage the image data, assuming that the data will be reused, so that the image data stored in the storage device can be provided to a user.

Meanwhile, it has been already known that encoded information is decoded by inputting information in which information such as a quick response code (QR code) and a barcode is encoded by two-dimensional or one-dimensional image data to an electronic device including an image reader, so that the information can be effectively reused.

Such a technique has been also known that, in a system that can store a image of an original read by an MFP as electronic data (image data) to enable reuse by combining the techniques mentioned above, information for specifying the stored document, an output parameters at the time of reuse, and the like are generated as marking information (code information), so that the stored document can be automatically reused at the time of reuse by inputting the marking information to the MFP (for example, see Japanese Patent Application Laid-open No. 2006-258898).

However, in the technique for specifying the document stored in the MFP from the marking information, when analysis of the marking information is performed, information such as a storage location of the document becomes readily available. Therefore, when the names of the document and its creator are used as the marking information, there is a security problem in that private information becomes readily available to a third party.

SUMMARY OF THE INVENTION

It is an object of the present invention to at least partially solve the problems in the conventional technology.

According to an aspect of the present invention, there is provided an image processor including a code-information recognizing unit that recognizes predetermined code information expressing information of an input image; a storage control unit that stores the input image in a predetermined storage device; a code-information generating unit that, in response to a notification that the input image has been stored in the storage device received from the storage control unit, generates two-dimensional code information expressing at least one of information relating to storage of the input image and an output parameters of the input image; a relating unit that relates the two-dimensional code information generated by the code-information generating unit and the input image stored in the storage device to each other; a printing unit that prints out the two-dimensional code information generated by the code-information generating unit onto a recording medium; an operating unit that receives input of two-dimensional code use information for using the two-dimensional code information; and a processing unit that retrieves an input image related to the two-dimensional code information recognized by the code-information recognizing unit from the storage device, when corresponding two-dimensional code information becomes available by the two-dimensional code use information input from the operating unit, and performs processing with respect to retrieved input image based on the two-dimensional code information.

According to another aspect of the present invention, there is provided an image processing method including recognizing predetermined code information expressing information of an input image; storing the input image in a predetermined storage device; generating, in response to completion of storing of the input image in the storage device at the storing, two-dimensional code information expressing at least one of information relating to storage of the input image and an output parameters of the input image; relating the two-dimensional code information generated at the generating and the input image stored in the storage device to each other; printing out the two-dimensional code information generated at generating onto a recording medium; receiving input of two-dimensional code use information for using the two-dimensional code information; and retrieving an input image related to the two-dimensional code information recognized at the recognizing from the storage device, when corresponding two-dimensional code information becomes available by the two-dimensional code use information received at the receiving, and performing processing with respect to an input image retrieved at the retrieving based on the two-dimensional code information.

According to still another aspect of the present invention, there is provided a computer program product that includes computer program codes stored on a computer-readable recording medium which when executed on a computer causes the computer to execute the above image processing method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table indicating an example of a relationship between a content of marking information generated by a marking-information generating unit in FIG. 1 and encrypted marking information;

DETAILED DESCRIPTION OF THE PREFERRED EMBODIMENTS

Exemplary embodiments of the present invention will be explained below in detail with reference to the accompanying drawings. In the embodiments, an image forming apparatus, particularly, an example of using the MFP is explained as the image processor. In the explanations below, for the sake of explanation, "image data" is also referred to as "image". Therefore, for example, "image data is printed on a sheet as a visual image" is equivalent to "an image is printed on a sheet".

Figure 1:
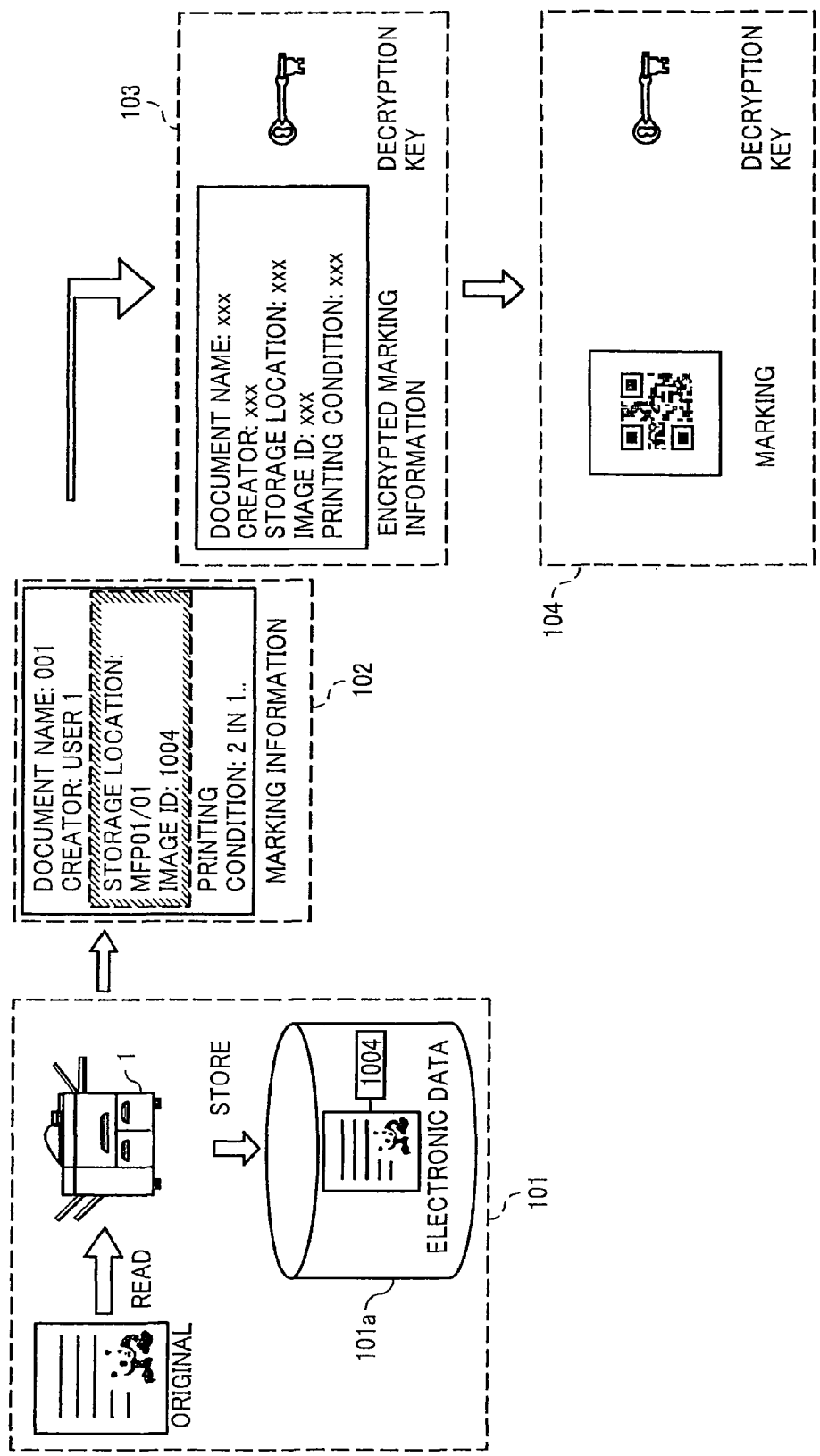
FIG. 1 is a schematic diagram for explaining one example of a marking generation process flow in an MFP according to a first embodiment of the present invention.

FIG. 1 is a schematic diagram for explaining one example of a marking generation process flow in an MFP 1 according to a first embodiment of the present invention.

In the MFP 1, a storage controller (storage control unit) 101 reads an image of an original (input image) set on a scanner (actually, at a read position on an exposure glass or the like), prepares a document as electronic data (image data), and stores the document in a memory (storage device) 101a (for example, in the MFP 1).

A marking-information generating unit 102 receives a notification that the document (input image) is stored in the memory 101a, and prepares two-dimensional marking information (two-dimensional code information) expressing relevance information (attribute information) for specifying the document, which is information relating to storage of the document, bibliographic information such as the names of the document and its creator, and output parameters information such as printing parameters of the document to be used at the time of reuse of the document. Accordingly, the marking-information generating unit 102 functions as a code-information generating unit. The two-dimensional code information (hereinafter, simply "marking information") may express at least one of the information relating to the storage of the document and the output parameters of the document. The marking-information generating unit 102 can prepare one-dimensional marking information instead of the two-dimensional code information.

An encrypting unit 103 encrypts the marking information generated by the marking-information generating unit 102, and generates a decryption key (decryption information) required for decrypting the encrypted marking information. Accordingly, the encrypting unit 103 functions as a code encrypting unit.

A marking-generation and output unit 104 generates a marking image such as a two-dimensional barcode from the marking information encrypted by the encrypting unit 103, and outputs the marking image together with the decryption key to the user. For example, the marking-generation and output unit 104 prints out the marking image on a recording medium such as a sheet, displays the marking image on an operation panel, or transmits the marking image by using a communication unit such as an e-mail. Accordingly, the marking-generation and output unit 104 functions as a printing unit.

Figure 2:
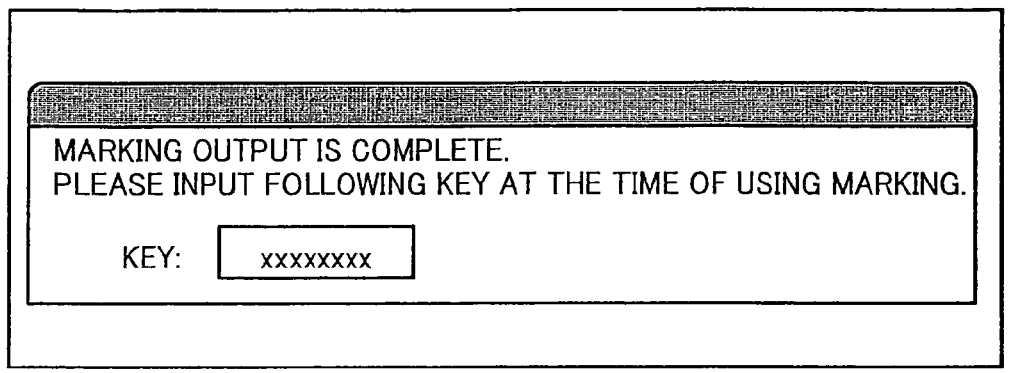
FIG. 2 is a screen example on an operation panel, when a key for decrypting a marking is presented to a user.

FIG. 2 is a screen example on the operation panel, when a key for decrypting the marking information (hereinafter, also "marking") is presented to the user.

The MFP 1 can notify the user of the decryption key by using the operation panel of the own machine. The decryption key is notified to the user as a character string.

Figure 3:
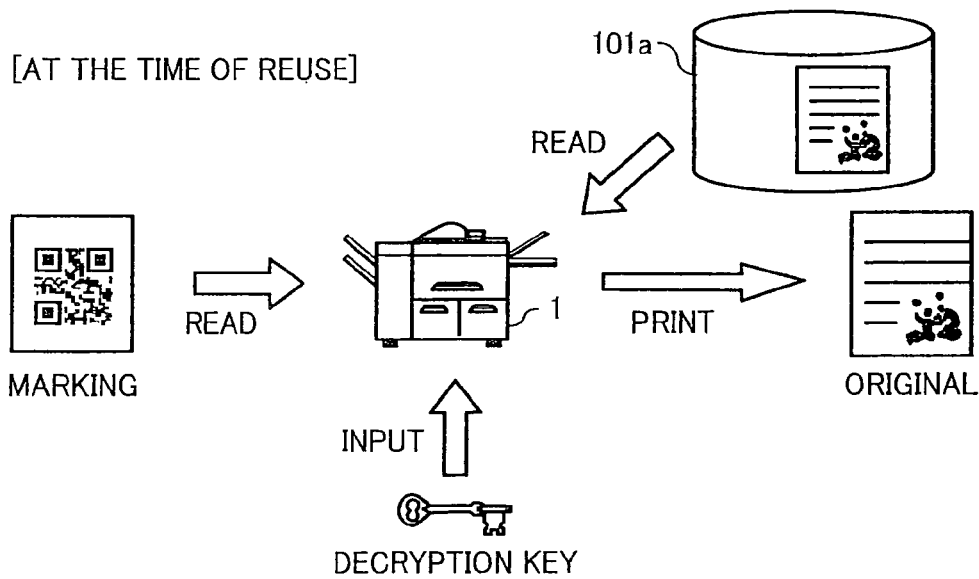
FIG. 3 is one example of a process flow at the time of reusing image data stored in a memory in FIG. 1.

FIG. 3 is one example of a process flow at the time of reusing the image data stored in the memory 101a in FIG. 1.

In the MFP 1, when the user inputs the marking and the decryption key output by the marking-generation and output unit 104 in FIG. 1, the image data (document) stored in the memory 101a can be read and reused.

Figure 4:
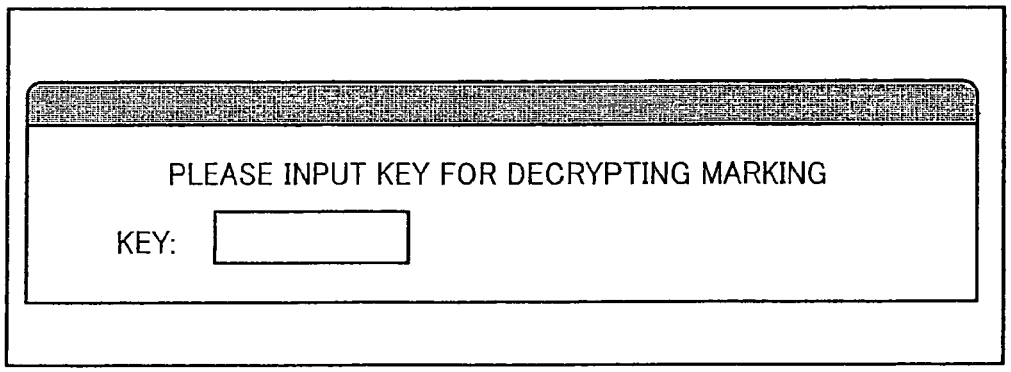
FIG. 4 is a screen example on the operation panel when the user inputs the key for decrypting the marking.

FIG. 4 is a screen example on the operation panel when the user inputs the key for decrypting the marking.

With the MFP 1, the user can input the decryption key, using the operation panel. The user is requested here to input the decryption key as a character string.

FIG. 5 is a table indicating an example of a relationship between the content of the marking information generated by the marking-information generating unit 102 in FIG. 1 and the encrypted marking information.

The information relating to the storage of the document, of the marking information generated by the marking-information generating unit 102 in the MFP 1, needs to include information such as the document name (file name) for specifying the document (image data), and an image ID as an image identifier for specifying an image in the document, and when the memory 101a that stores the document includes an electronic device (MFP or the like) other than the own machine, information of a storage location including information for specifying the electronic device (storage device) and a folder, in which the document is stored. Date when the document is stored in the memory 101a can be added. Alternatively, the information can include at least one of these pieces of information.

When the document is reused by using the marking, output parameters information including printing parameters at the time of reuse is generated also as the marking information.

When encryption is performed with respect to the generated marking information, the document information, the image information, and the output parameters information cannot be decrypted without the decryption key.

Figure 12:
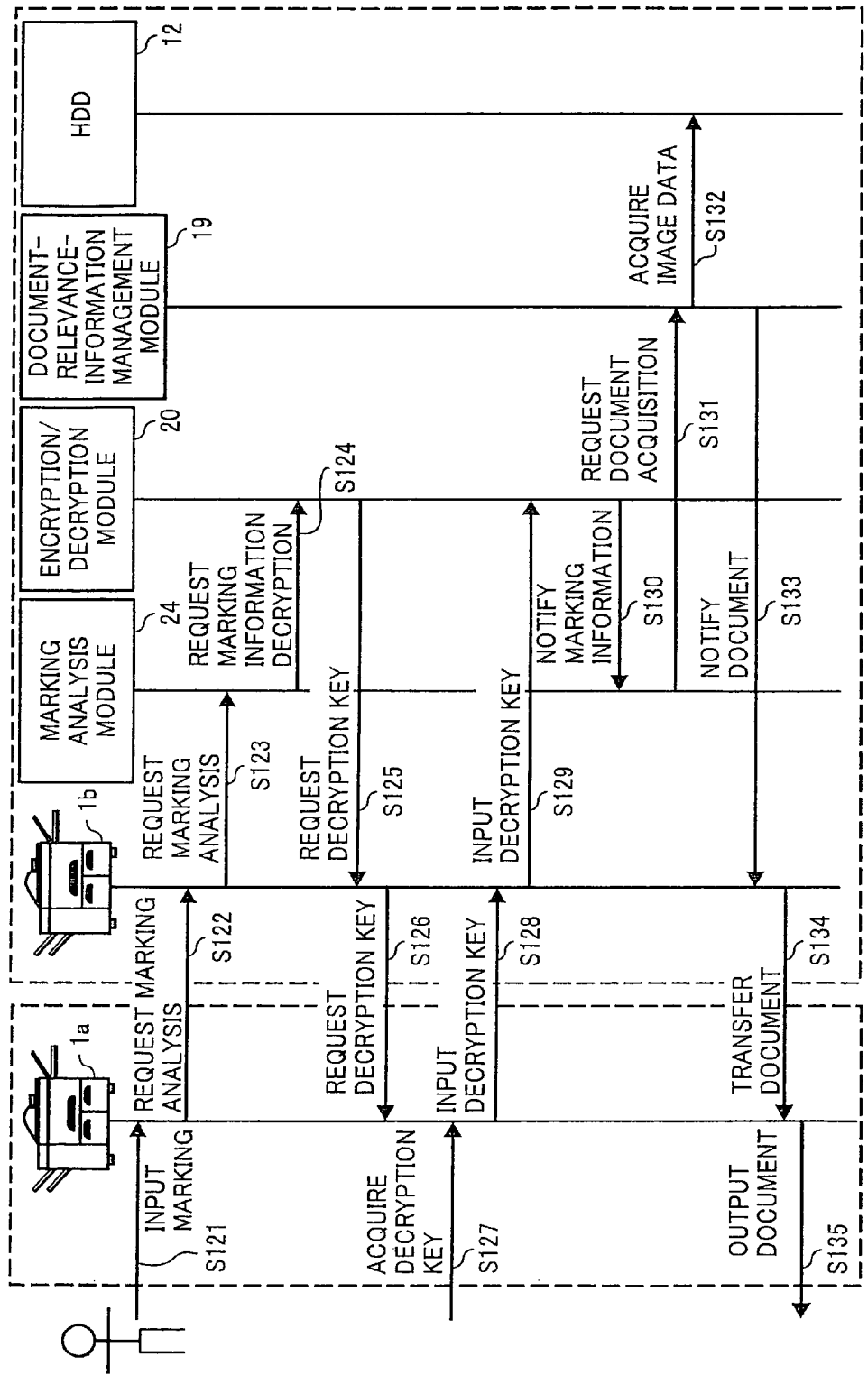
FIG. 12 is a communication sequence diagram of one example of exchange between respective modules until the document is acquired, when an electronic device in which the document indicated by the marking read from the original set on the scanner is stored is an electronic device other than the own machine.

Further, when only the device information can be read without the decryption key, and the device information in the marking information stored in the input marking is different from the device information of the own machine, acquisition of the document can be requested to the electronic device corresponding to the input device information (see FIG. 12).

A network environment using the MFP 1 and specific configuration and control of the MFP 1 are explained below.

Figure 6:
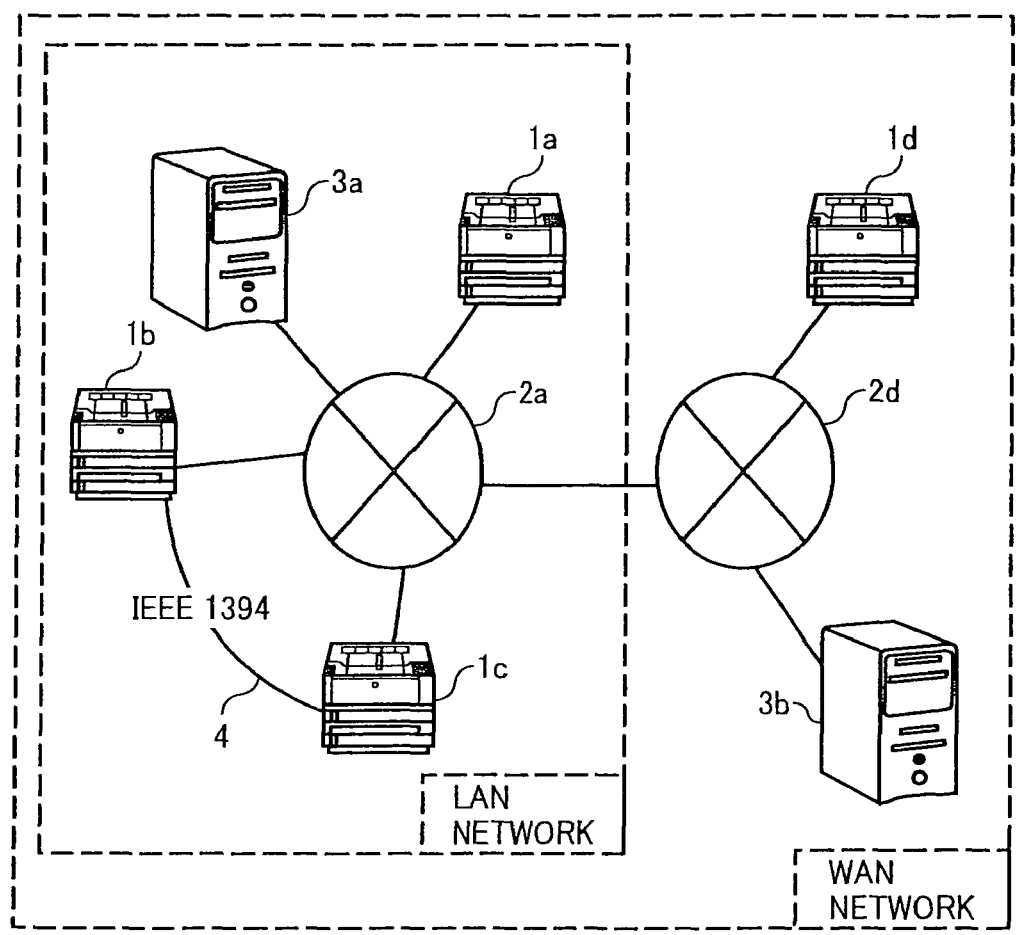
FIG. 6 is an example of a network environment using an MFP as an image processor according to the present invention.

FIG. 6 is an example of the network environment using the MFP 1.

A plurality of MFPS 1 (1a, 1b, 1c, 1d) is connected to a plurality of servers 3 (3a, 3b) and another electronic device such as a personal computer (PC) (not shown) in a network environment of a local area network (LAN) 2 (2a, 2b) and a wide area network (WAN) connecting the LANS 2 to each other, so that the respective electronic device can communicate with each other.

The MFP 1 is an image processor in which a plurality of functions of a copying machine, a scanner, a printer, and a fax machine are combined.

The server 3 is a high-function information processor (computer device).

A communication line 4 is an IEEE 1394 communication line, which connects the MFP 1 individually.

The servers 3a and 3b are connected for other MFPS 1 and storage of documents on the network of LAN 2 or WAN, so that the image data of the original respectively input by each MFP 1 can be stored in the device, which becomes a server for devices other than the own machine.

Figure 7:
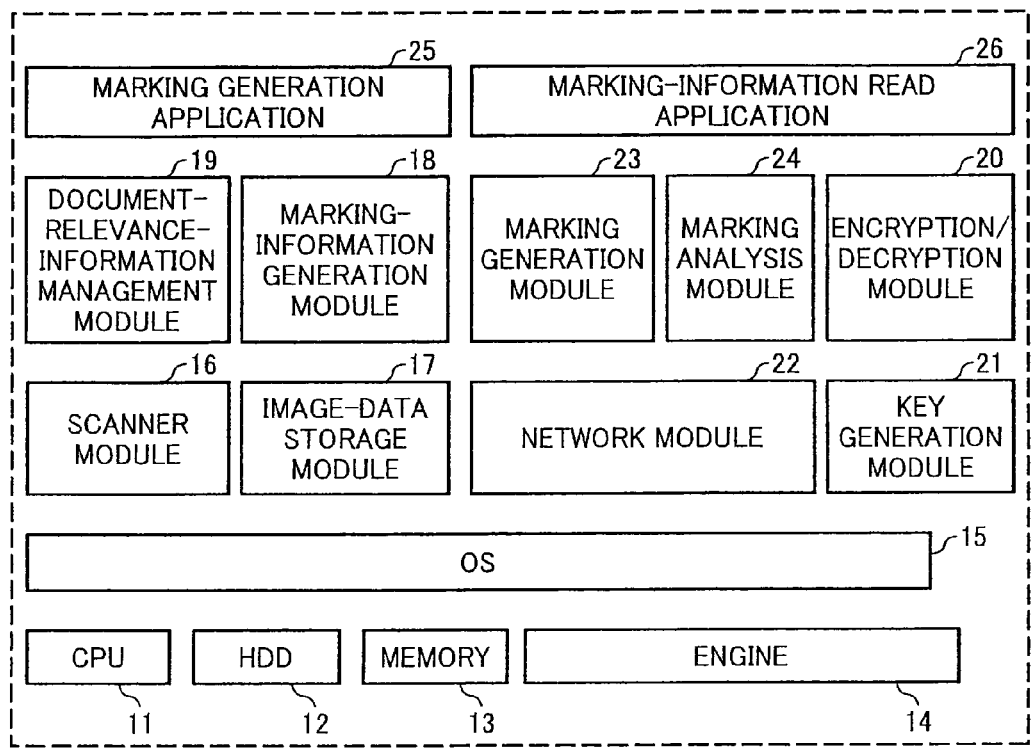
FIG. 7 is a block diagram of a configuration example of a control system of the MFP according to the first embodiment.

FIG. 7 is a block diagram of a configuration example of a control system of the MFP 1.

The MFP 1 includes hardware (resources) of a central processing unit (CPU) 11, a hard disk drive (HDD) 12, a memory 13, and an engine 14, and software of an operating system (OS) 15, a scanner module 16, an image-data storage module 17, a marking-information generation module 18, a document-relevance-information management module 19, an encryption/decryption module 20, a key generation module 21, a network module 22, a marking generation module 23, a marking analysis module 24, a marking generation application 25, and a marking-information read application 26.

The CPU 11 performs various types of processing (including control of the hardware) by executing each program (software) described later as required. The CPU 11 executes each program and controls the devices including the operation panel (not shown), thereby functioning as the storage controller 101, the marking-information generating unit 102, the encrypting unit 103, and the marking-generation and output unit 104. That is, the functions as a code-information recognizing unit, the storage control unit, a code-information generating unit, an relating unit, the code encrypting unit, the printing unit, an operating unit, and a processing unit, which are functions included in the present invention, can be realized. For convenience' sake, there are cases that the program itself performs the processing.

The HDD 12 is a storage device that stores and holds a large quantity of data, and corresponds to the memory 101a in FIG. 1.

The memory 13 is, for example, a read only memory (ROM) that stores fixed data including a boot loader (boot program) and a random access memory (RAM) used when the CPU 11 performs processing.

The engine 14 is the hardware corresponding to the scanner (image reader) that reads an image on the original, and a plotter (image forming apparatus) that prints image data read by the scanner and image data received from an external electronic device on a sheet (can be another recording medium) as a visual image.

The OS 15 is basic software used by the CPU 11 to perform various types of processing (control of the entire apparatus).

The scanner module 16 is software that reads a normal image on the original and a marking image.

The image-data storage module 17 is software that stores the image on the original read by the scanner module 16 in the memory (the HDD 12 here) as image data, which is electronic data.

The marking-information generation module 18 is software that generates bibliographic information (auxiliary information of the document) such as the document name of image data (document) stored in the HDD 12 by the image-data storage module 17, information relating to storage of the image data such as storage locations, and an output parameters such as printing parameters at the time of reusing the image data, as the marking information.

The document-relevance-information management module 19 is software that manages the marking information generated by the marking-information generation module 18 as relevance information of the document (related to the stored document).

The encryption/decryption module 20 is software that performs encryption and decryption of the marking information generated by the marking-information generation module 18.

The key generation module 21 is software that automatically generates a key required for encryption and decryption.

The network module 22 is software that exchanges information with another electronic device on the network.

The marking generation module 23 is software that generates a two-dimensional marking image.

The marking analysis module 24 is software that analyzes the marking image.

The marking generation application 25 is application software that performs various types of processing involved with the generation of the marking, and can request the CPU 11 to perform various types of processing.

The marking-information read application 26 is application software that reads the marking information, and can request the CPU 11 to read the marking information.

The application software requests the CPU 11 to execute a job, and there are copy application, printer application, and FAX application, other than the marking generation application 25 and the marking-information read application 26.

The copy application can request the CPU 11 to execute a job for allowing the scanner (now shown) to read an image on the original, sending the image data to the plotter in the engine 14, and printing (forming) the image as a visual image on the sheet.

The printer application can request the CPU 11 to execute a job for sending printing information from the PC or the like to the plotter in the engine 14 directly (in this case, printing information=image data) or after performing conversion processing to image data, to be printed as a visual image on the sheet.

The FAX application can request the CPU 11 to execute a job for reading the image on the original by the scanner in the engine 14, to transmit the image information to another electronic device by FAX (facsimile), or receiving image information from another electronic device by FAX, and sending the image information to the plotter in the engine 14 to be printed as a visual image on the sheet.

Figure 8:
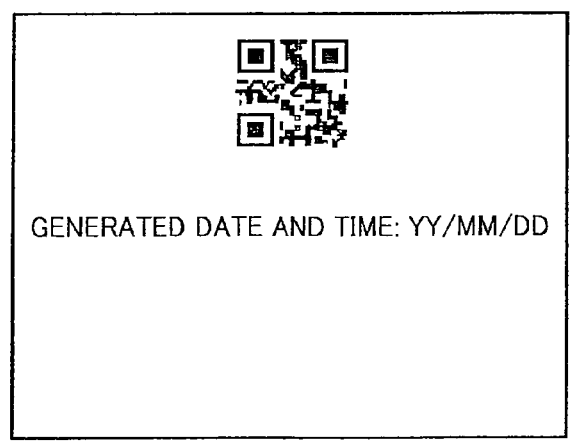
FIG. 8 is an example of a printed matter when a generated marking is printed on a sheet.

FIG. 8 is an example of a printed matter when the generated marking is printed on the sheet.

The MFP 1 provides the marking to the user by printing the marking on the sheet as shown in FIG. 8.

Figure 9:
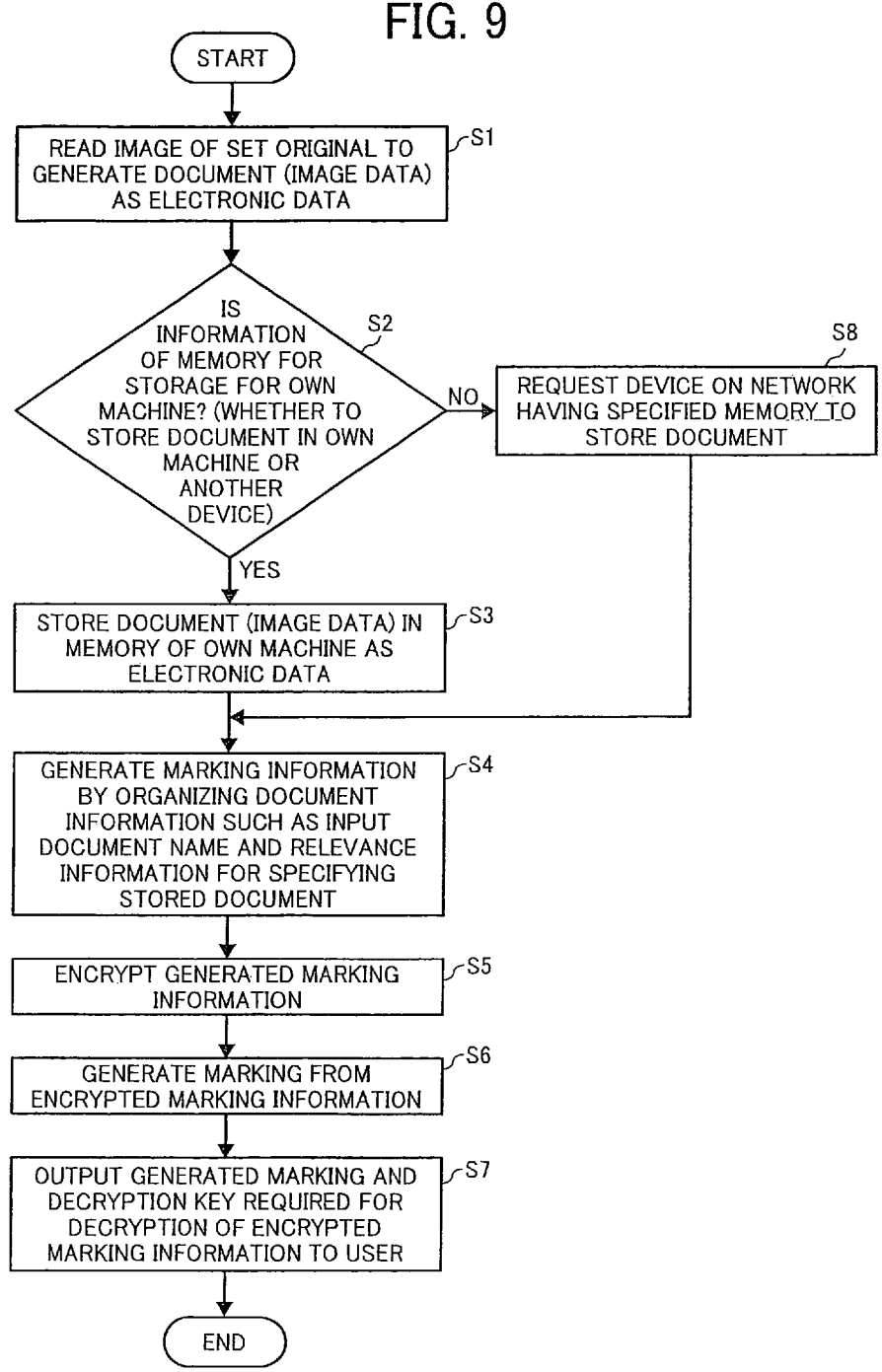
FIG. 9 is a flowchart of a first example of a process procedure from generation of a document from an original set on a scanner in the MFP shown in FIG. 7 until output of a marking.

FIG. 9 is a flowchart of a first example of a process procedure from generation of a document from the original set on the scanner in the MFP 1 shown in FIG. 7 until output of the marking.

The MFP 1 starts a processing routine shown in FIG. 9, when setting of the original including a normal image on the scanner is detected by a predetermined sensor (not shown) (or a document registration is instructed by an operation on the operation panel in a state with the original of the normal image being set on the scanner), to perform a process at step S1.

That is, the MFP 1 reads the normal image on the original set on the scanner by the user, generates a document (image data) as electronic data, and determines in which memory the document is to be stored at step S2.

When the memory in the own machine is specified as a storage destination of the document, the MFP 1 determines to store the generated document in the memory of the own machine, and stores the document in the memory (the HDD 12) of the own machine at step S3. When a memory of an electronic device (the MFP 1 or the like) on the network, which is another electronic device, is specified as the storage destination of the document, the MFP 1 determines to store the generated document in the memory of the electronic device, and requests the electronic device to store the document at step S8, so that the generated document is stored in the memory of the electronic device.

Thereafter, the MFP 1 proceeds to step S4, to generate marking information by organizing the document information such as the input document name and the relevance information for specifying the stored document, performs encryption of the marking information at step S5, and generates a decryption key for decrypting the encrypted marking information.

The MFP 1 then generates a marking such as a two-dimensional barcode from the encrypted marking information generated at step S6, and proceeds to the last step S7.

At step S7, the MFP 1 outputs the generated marking and the decryption key for decrypting (restoring) the encrypted marking information to the user. The marking is printed on the sheet by the plotter.

Figure 10:
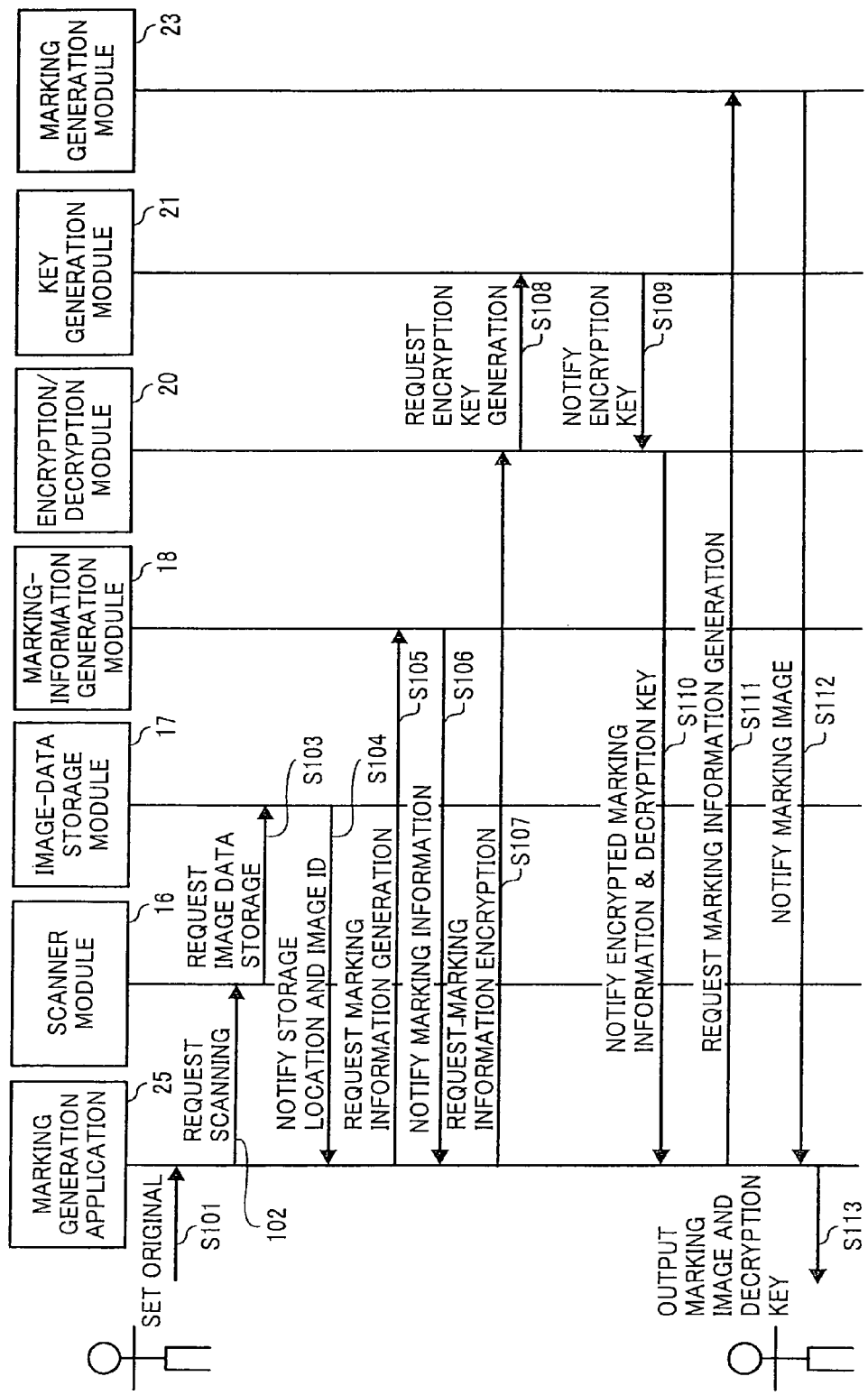
FIG. 10 is a communication sequence diagram of one example of exchange between respective modules from generation of the document from the original set on the scanner until output of the marking.

FIG. 10 is a communication sequence diagram of one example of exchange between respective modules from generation of the document from the original set on the scanner in the MFP 1 shown in FIG. 7 until output of the marking.

In the MFP 1, the marking generation application 25 makes a scan request to the scanner module 16, for example, when setting of the original on the scanner is detected by a predetermined sensor (S101, S102).

The scanner module 16 reads the image on the original set on the scanner, in response to the scan request, to generate image data (document) as electronic data from the image, and makes an image data storage request to the image-data storage module 17 with the generated image data (S103).

The image-data storage module 17 stores the image data from the scanner module 16 in the HDD 12, according to the image data storage request, and sends an image ID for specifying the stored image data and a storage location to the marking generation application 25 (S104).

The marking generation application 25 requests the marking-information generation module 18 to prepare (generate) marking information with these pieces of information (S105).

The marking-information generation module 18 prepares marking information based on the information sent from the marking generation application 25 in response to the request, and sends the marking information to the marking generation application 25 (S106).

The marking generation application 25 requests the encryption/decryption module 20 to encrypt the prepared marking information (S107).

The encryption/decryption module 20 requests the key generation module 21 to generate an encryption key, in response to the request (S108).

The key generation module 21 generates the encryption key according to the request, and sends the encryption key to the encryption/decryption module 20 (S109).

The encryption/decryption module 20 encrypts the marking information prepared by the marking generation application 25 with the encryption key sent from the key generation module 21. After encryption of the marking information, the encryption/decryption module 20 sends the encrypted marking information and a decryption key for decrypting the encrypted marking information to the marking generation application 25 (S110).

The marking generation application 25 requests the marking generation module 23 to generate the marking information from the encrypted marking information (S111).

The marking generation module 23 prepares a two-dimensional marking image based on the encrypted marking information, in response to the request, and sends the marking image to the marking generation application 25 (S112).

Upon reception of the marking image from the marking generation module 23 as well as the decryption key, the marking generation application 25 outputs the marking image and the decryption key (S113).

Figure 11:
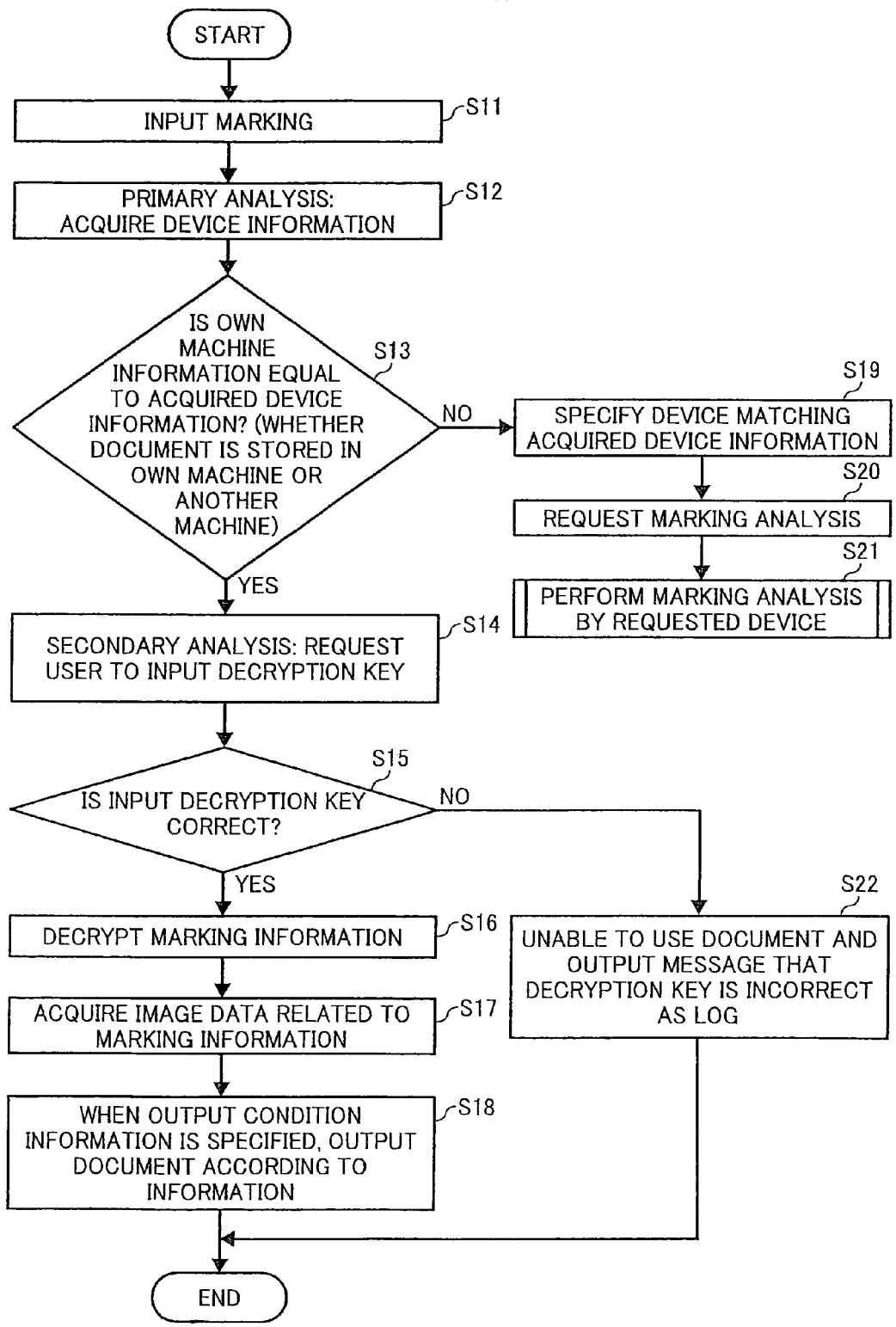
FIG. 11 is a flowchart of a first example of a process procedure until a document indicated by the marking is output from the original set on the scanner.

FIG. 11 is a flowchart of a first example of a process procedure until a document indicated by the marking is output from the original set on the scanner in the MFP 1 shown in FIG. 7.

The MFP 1 starts a processing routine shown in FIG. 11, when setting of the original including the marking image on the scanner is detected by a predetermined sensor (or a document output is instructed by an operation on the operation panel in a state with the original being set on the scanner).

At step S11, marking input is performed. That is, the marking image on the original set on the scanner by the user is read by the scanner.

At step S12, the MFP 1 analyzes the read marking image to recognize the content (primary analysis), to acquire the encrypted marking information, device information, and the decryption key.

At step S13, the MFP 1 determines whether the device information acquired from the marking image is of the own machine or another machine. When the device information is of another machine, the location where the corresponding document is stored is the electronic device other than the own machine. Therefore, the MFP 1 proceeds to step S19.

At step S19, the MFP 1 specifies the electronic device matching the acquired device information.

At step S20, the MFP 1 requests the specified electronic device to perform marking analysis.

The requested electronic device performs marking analysis at step S21.

When the device information acquired from the read marking image is of the own machine, at step S14, the MFP 1 requests the user to input the decryption key (marking use information for using the marking information) by a display on the operation panel. After acquiring (receiving) the decryption key input by the user operation on the operation panel, at step S15, the MFP 1 determines whether the input decryption key is correct. When the decryption key is not correct (when the input decryption key is different from the correct decryption key acquired from the marking image), the MFP 1 proceeds to step S22, to determine that the document cannot be used (the marking information cannot be used) and output a message that the input decryption key is incorrect as a log (history). This message is printed here on the sheet by the plotter.

When the acquired decryption key is correct (when the acquired decryption key matches the correct decryption key), the document becomes available (the marking information becomes available), and the MFP 1 proceeds to step S16, to decrypt the marking information acquired from the marking image read based on the decryption key, thereby acquiring the marking information. At step S17, the MFP 1 retrieves (specifies) the document related to the acquired marking information from the memory, to acquire the document (image data).

The MFP 1 then proceeds to step S18, to output the acquired document. At this time, when the output parameters information is specified with respect to the document, the MFP 1 automatically outputs the document according to the information.

FIG. 12 is a communication sequence diagram of one example of exchange between respective modules until the document is acquired, when the electronic device in which the document indicated by the marking read from the original set on the scanner in the MFP 1 shown in FIG. 7 is stored is an electronic device other than the own machine. In FIG. 12, illustration of the network module 22 is omitted.

An MFP 1a reads the marking image (marking input) (S121), and when the device information acquired from the marking image is of an MFP 1b, which is different from the own machine (when the electronic device in which the corresponding document is stored is the MFP 1b), the MFP 1a requests the MFP 1b to perform marking analysis (S122). At this time, the read marking image is attached to the request.

Upon reception of the marking analysis request, the network module 22 in the MFP 1b transmits the request to the marking analysis module 24 (S123).

Upon reception of the marking analysis request, the marking analysis module 24 analyzes the marking image to recognize the content, acquires the encrypted marking information and the decryption key, and transmits a marking information decryption request including these pieces of information to the encryption/decryption module 20 (S124).

Upon reception of the marking information decryption request, the encryption/decryption module 20 stores the encrypted marking information and the decryption key attached thereto, and transmits a decryption key request to the network module 22 (S125).

Upon reception of the decryption key request, the network module 22 transmits the decryption key request to the MFP 1a (S126).

Upon reception of the decryption key request, the MFP 1a performs the process at step S14 in FIG. 11 to acquire the decryption key, and transmits the decryption key to the MFP 1b (S127, S128).

Upon reception of the decryption key, the network module 22 in the MFP 1b transmits the decryption key to the encryption/decryption module 20 (S129).

Upon reception of the decryption key, the encryption/decryption module 20 determines whether the decryption key is correct. When the decryption key is correct (matches the correct decryption key stored and held beforehand), the encryption/decryption module 20 decrypts the stored and held marking information based on the decryption key to acquire the marking information, and transmits the marking information to the marking analysis module 24 (S130).

Upon reception of the marking information, the marking analysis module 24 transmits a document acquisition request including the marking information to the document-relevance-information management module 19 (S131).

Upon reception of the marking information, the document-relevance-information management module 19 specifies a document (image data) related to the marking information attached thereto, reads and acquires the document from the HDD 12, and transmits the document to the network module 22 (S132, S133).

Upon reception of the document, the network module 22 transmits (transfers) the document to the MFP 1a (S134).

Upon reception of the document, the MFP 1a outputs the document (S135). At this time, when the output parameters information is specified with respect to the document, the MFP 1a automatically outputs the document according to the information.

Figure 13:
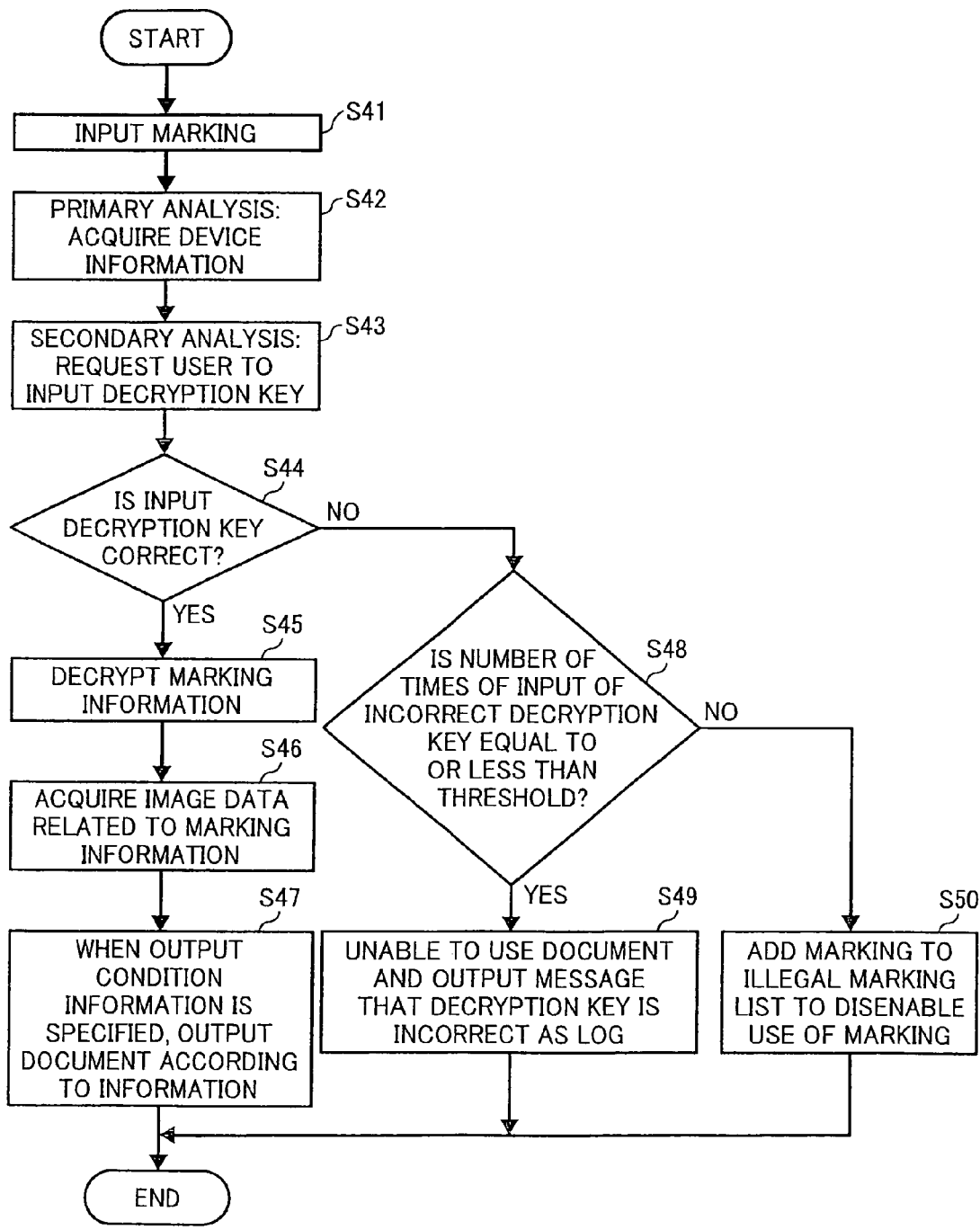
FIG. 13 is a flowchart of a second example of a process procedure until a document indicated by the marking is output from the original set on the scanner.

FIG. 13 is a flowchart of a second example of a process procedure until a document indicated by the marking is output from the original set on the scanner in the MFP 1 shown in FIG. 7, where a process to disenable an illegal marking at the time of decrypting the encrypted marking information is added. For the sake of illustration, processes corresponding to steps S13 and S19 to S21 in FIG. 11 are omitted.

At steps S41 to S47, the MFP 1 performs the same processes as at steps S11, S12, and S14 to S18.

When the MFP 1 determines that the decryption key input at step S44 is incorrect, the MFP 1 determines whether the number of times of the incorrect decryption key input up to now with respect to the marking read this time is equal to or less than a predetermined number of times (threshold) at step S48. When the number of times is equal to or less than the predetermined number of times, at step S49, the MFP 1 performs the same process as at step S22 in FIG. 11. If the number of times exceeds the predetermined number of times, the MFP 1 proceeds to step S50, to add the marking read this time to an illegal marking list and manage the illegal marking list, thereby disenabling an illegal use of the marking.

Although not shown in FIG. 13, a process to count the error frequency of the input decryption key is performed for each marking read.

Figure 14:
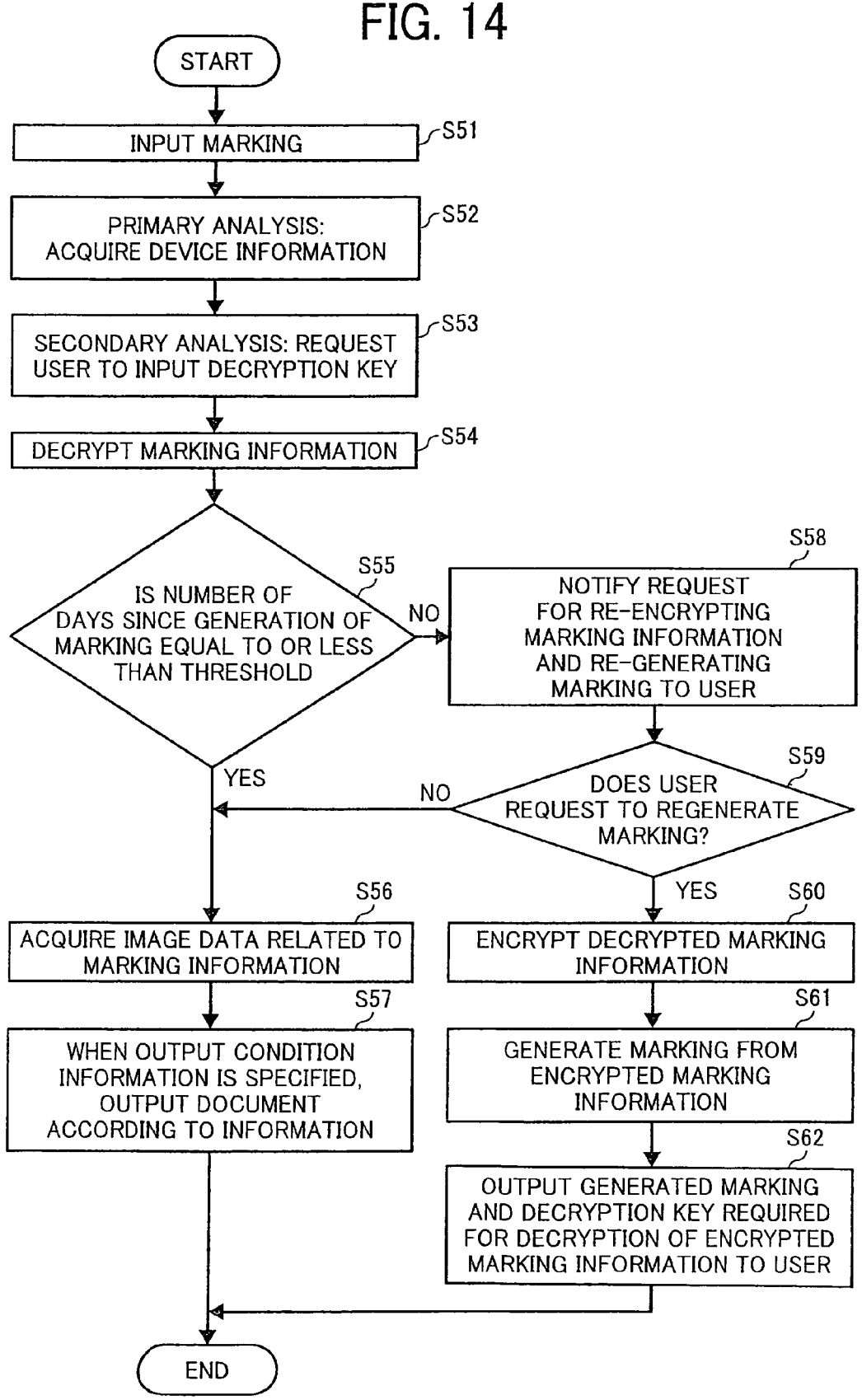
FIG. 14 is a flowchart of a third example of a process procedure until a document indicated by the marking is output from the original set on the scanner.

FIG. 14 is a flowchart of a third example of a process procedure until a document indicated by the marking is output from the original set on the scanner in the MFP 1 shown in FIG. 7, where a process to re-encrypt the marking, for which a predetermined period (predetermined number of days) has passed since marking preparation date, is added. For the sake of illustration, processes corresponding to steps S44 and S48 to S50 in FIG. 13 are omitted.

At steps S51 to S54, the MFP 1 performs the same process as at steps S41 to S45 in FIG. 13, and proceeds to step S55, at which the MFP 1 confirms the decrypted marking information, and determines whether the number of days since generation of the marking read this time is equal to or less than a predetermined period (threshold). When the number of days is equal to or less than the predetermined period, at steps S56 and S57, the MFP 1 performs the same process as at steps S46 and S47. When the number of days exceeds the predetermined period, the MFP 1 proceeds to step S58, to prompt (request) the user to re-encrypt the marking information and re-generate the marking by a display on the operation panel.

Although not shown in FIG. 14, a process to count the number of days since generation of the marking is performed for each marking read.

The MFP 1 checks whether regeneration of the marking is requested in response to the notification, at step S59, and if regeneration of the marking is not requested, the MFP 1 proceeds to step S56.

When regeneration of the marking is requested by the user operation on the operation panel, at step S60, the MFP 1 performs the encryption process again with respect to the already decrypted marking information, and at step S61, generates a new marking from the encrypted marking information. The MFP 1 then proceeds to step S62, to output the generated marking and a decryption key for decrypting the encrypted marking information to the user. The marking is printed here on the sheet by the plotter.

Figure 15:
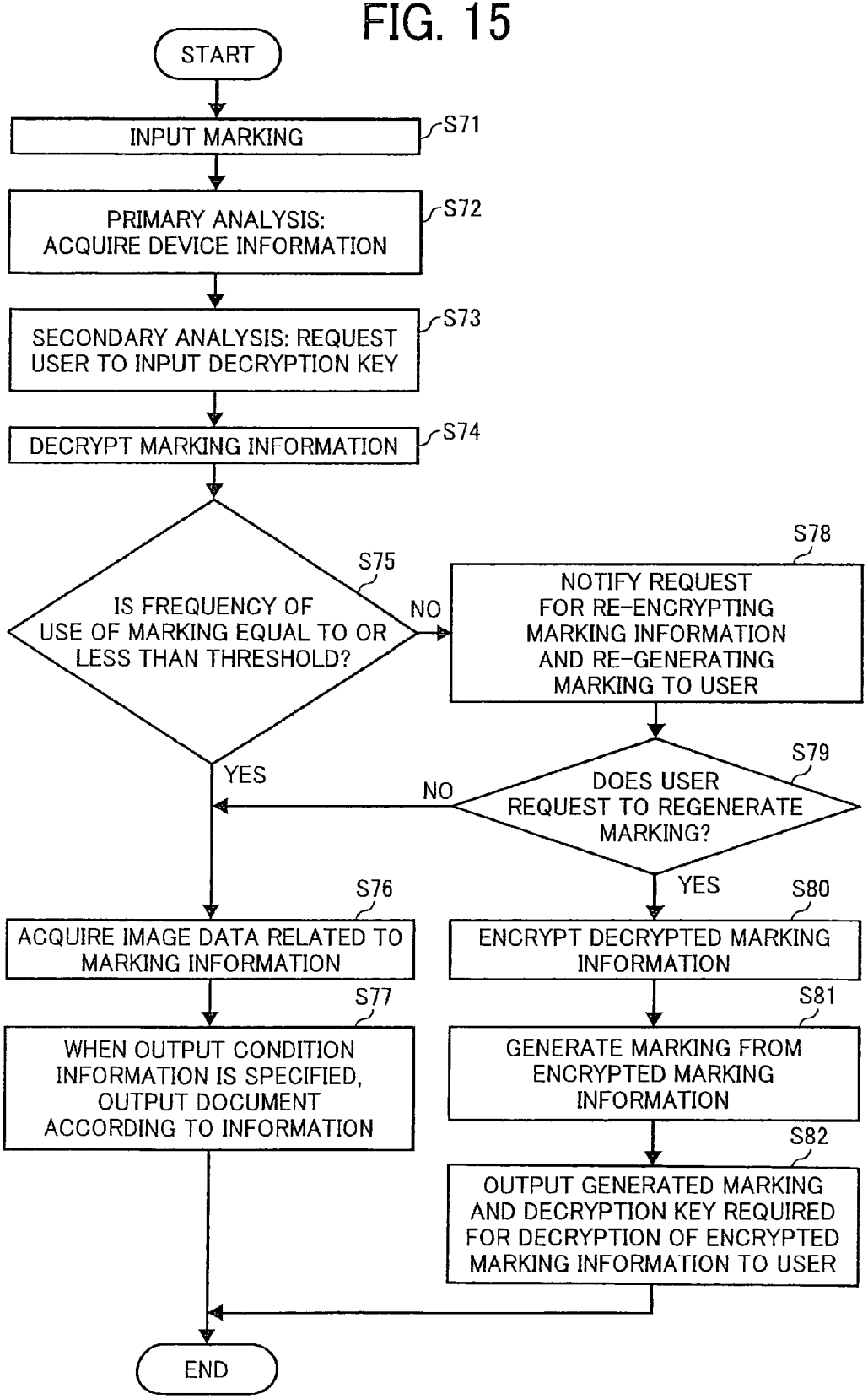
FIG. 15 is a flowchart of a fourth example of a process procedure until a document indicated by the marking is output from the original set on the scanner.

FIG. 15 is a flowchart of a fourth example of a process procedure until a document indicated by the marking is output from the original set on the scanner in the MFP 1 shown in FIG. 7, where a process to re-encrypt the marking, for which a frequency of use of the marking exceeds a predetermined number of times, is added. For the sake of illustration, processes corresponding to steps S44 and S48 to S50 in FIG. 13 are omitted.

At steps S71 to S74, the MFP 1 performs the same process as at steps S41 to S45 in FIG. 13, and proceeds to step S75, at which the MFP 1 confirms the decrypted marking information, and determines whether the frequency of use of the marking read this time is equal to or less than a predetermined frequency (threshold). When the frequency of use is equal to or less than the predetermined frequency, at steps S76 and S77, the MFP 1 performs the same process as at steps S46 and S47 in FIG. 13. When the frequency of use exceeds the predetermined frequency, the MFP 1 proceeds to step S78, to prompt the user to re-encrypt the marking information and re-generate the marking by a display on the operation panel. At steps S79 to S82, the MFP 1 then performs the same process as at steps S59 to S62 in FIG. 14.

Although not shown in FIG. 15, a process to count the frequency of use of the marking is performed for each marking read.

An MFP according to a second embodiment of the present invention is explained next. Parts different from the first embodiment will be mainly explained below.

Figure 16:
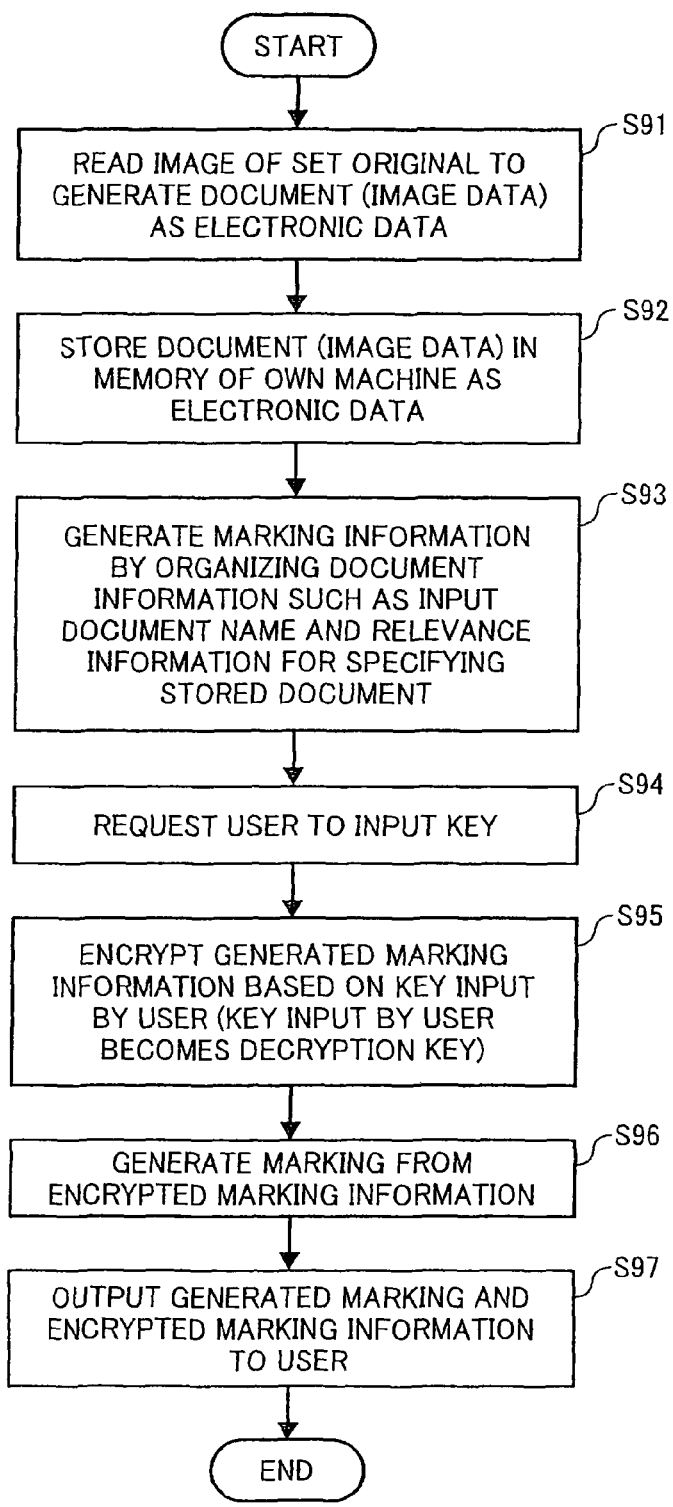
FIG. 16 is a flowchart of a second example of a process procedure from generation of the document from the original set on the scanner until output of the marking.

FIG. 16 is a flowchart of a second example of the process procedure from generation of the document from the original set on the scanner in the MFP 1 shown in FIG. 7 until output of the marking, where a process procedure at the time of performing the encryption process in which the decryption key is a key input by the user is shown.

At steps S91 to S93, the MFP 1 performs the same process as at steps S1, S3, and S4 in FIG. 9, and then performs the following process before performing encryption of the marking information.

That is, at step S94, the MFP 1 requests the user to input a key by a display on the operation panel, and proceeds to step S95, to encrypt the generated marking information based on the key input by the user operation on the operation panel (which becomes the decryption key at the time of reusing the marking). At step S96, the MFP 1 generates the marking from the generated encrypted marking information, to proceed to step S97, at which the MFP 1 outputs the generated marking and the encrypted marking information to the user. The MFP 1 prints the marking on the sheet by the plotter here.

Figure 17:
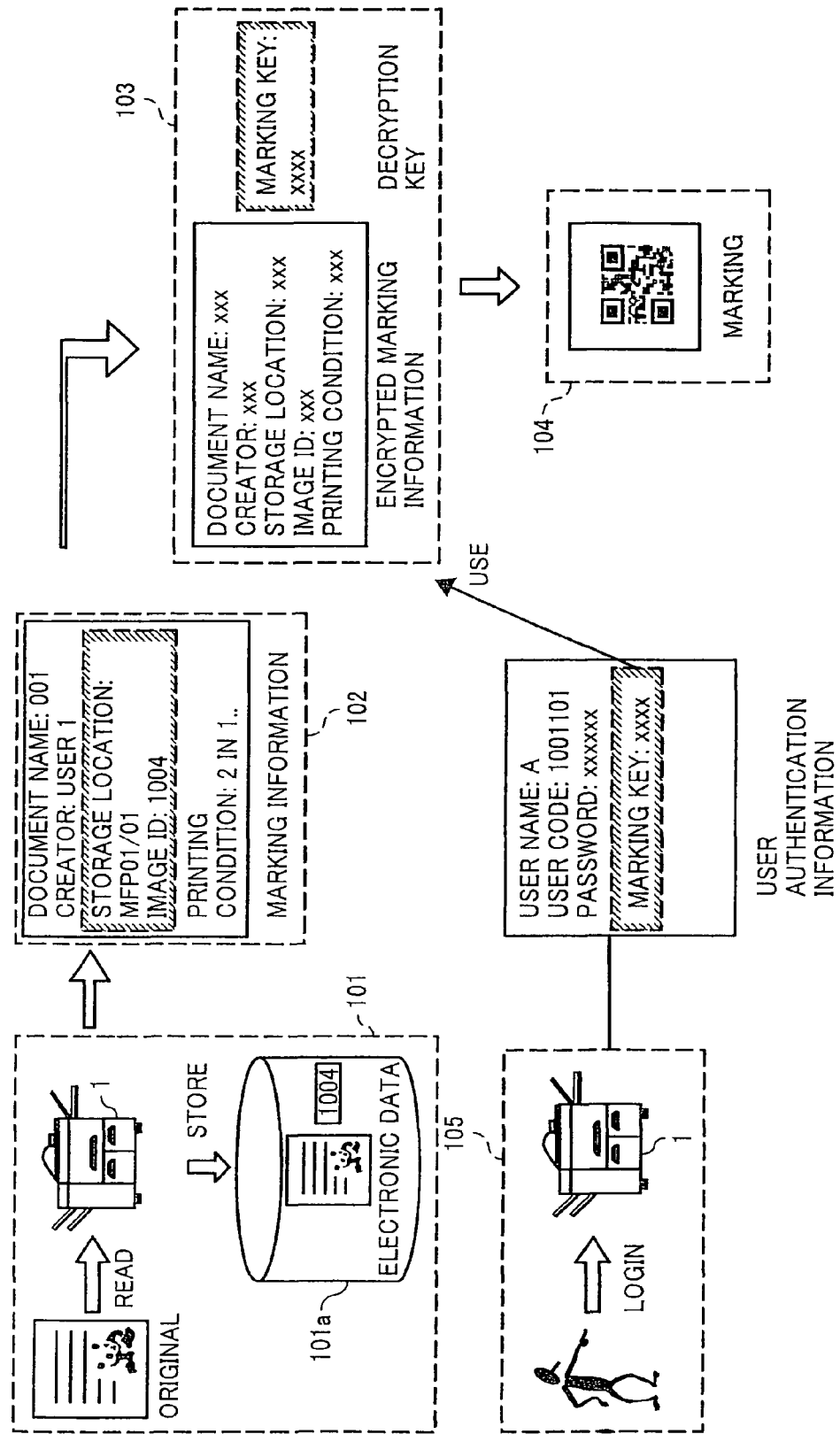
FIG. 17 is a schematic diagram for explaining one example of a marking generation process flow in an MFP according to a second embodiment of the present invention.

FIG. 17 is a schematic diagram for explaining one example of the marking generation process flow in the MFP according to the second embodiment, where like reference numerals refer to like parts corresponding to FIG. 1.

The MFP 1 according to the second embodiment is an electronic device that requires user authentication when the own machine is used by the user (at the time of storing the document).

In the MFP 1, a user authenticating unit 105 holds information (marking key) required when the marking information is encrypted/decrypted in user authentication information (information to be used in user authentication for specifying the user). When the marking information is encrypted in a state with the user logging in (in a state after user authentication is successful), the marking key in the user authentication information is used as the decryption key to perform encryption, thereby simplifying key input operations of the user.

Because the CPU 11 in FIG. 7 executes the respective programs and controls the device including the operation panel, the CPU 11 functions as the storage controller 101, the marking-information generating unit 102, the encrypting unit 103, the marking-generation and output unit 104, and the user authenticating unit 105.

Figure 18:
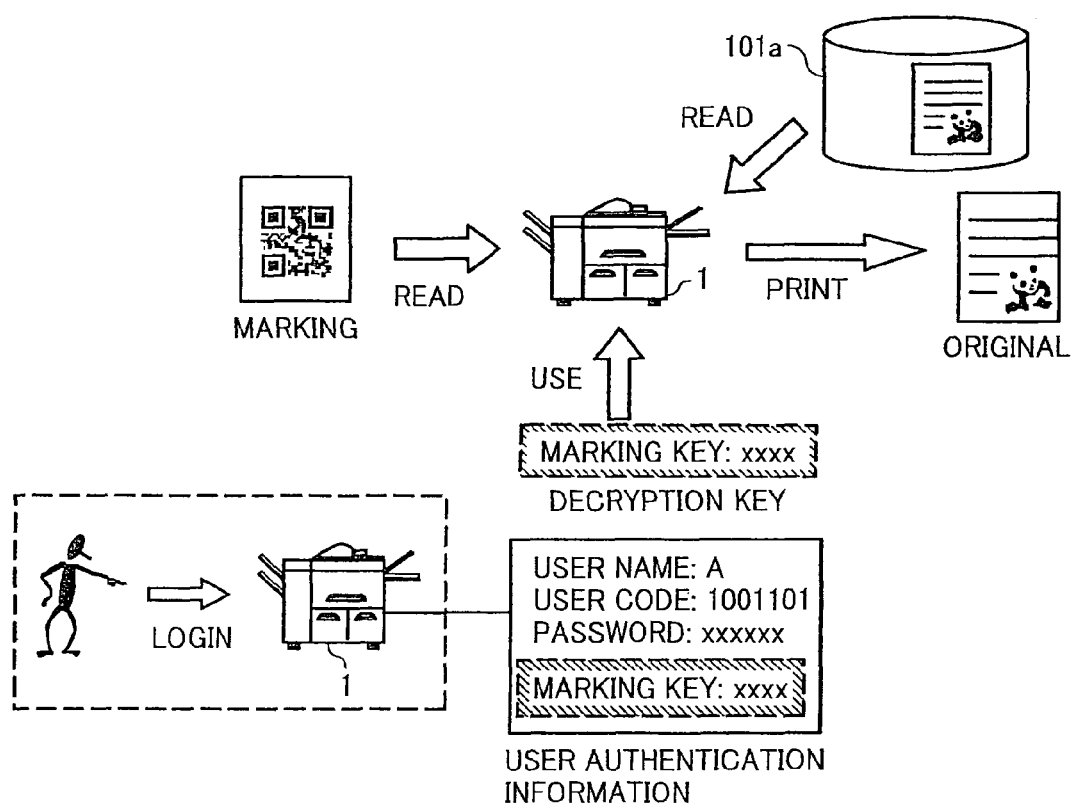
FIG. 18 is a schematic diagram for explaining one example of a process flow when image data stored in a memory in FIG. 17 is reused.

FIG. 18 is a schematic diagram for explaining one example of a process flow when the image data stored in the memory 101a in FIG. 17 is reused.

In the MFP 1, when the document is reused by using the marking, the user logs in the own machine beforehand, to simplify the key input operation by the user by decrypting the encrypted marking information based on the marking key stored in the user authentication information.

According to the MFP in the above embodiments, action and effects shown in (1) to (14) below can be obtained.

(1) After the image on the original is stored in the memory as a document (image data), the marking information (code information) is generated from the relevance information of the stored document and the attribute information thereof, the marking information is encrypted, and a marking image is generated from the encrypted marking information and output to the user (printed out on a recording medium). Therefore, a risk that the marking information is read by a third party can be avoided, and the document that can be reused based on the marking information can be prevented from being illegally used by the third party.

(2) Because the storage controller that stores the document in the memory stores the document in the memory of the own machine, the document can be reused with a simple structure.

(3) Because the storage controller stores the document in the memory of the electronic device (image processor), which is a server on the network, or the electronic device for storing documents, the stored documents can be used from various locations.

(4) The generated marking information includes a use method, the image processing condition, and the output parameters at the time of reusing the document, in addition to static information of the document such as the names of the document and its creator. Therefore, by embedding the method and the output parameters at the time of using the stored document in the marking information, the embedded condition can be automatically adopted to output the document at the time of using the stored document. Accordingly, the document can be used with the user operation being reduced.

(5) Because the information for specifying the electronic device is held in the generated marking information, the document stored in the device other than the own machine can be used by embedding the information for specifying the electronic device in the marking information.

(6) Encryption can be performed by using the information input by the user as the decryption key, which can be used at the time of decrypting the encrypted document. Therefore, the user can directly specify the decryption key, thereby enabling to perform decryption with information that can be easily handled (memorized) by the user.

(7) Encryption can be performed by using information automatically generated as the decryption key, which can be used at the time of decrypting the encrypted document. By generating the decryption key automatically, the user operation at the time of storing the document can be made simpler.

(8) When user authentication is required at the time of using the own machine, if authentication is required again at the time of storing the document and reusing the document, the user operation becomes complicated. Therefore, if encryption is performed by using user information required for user authentication, and at the time of using the marking, decryption is performed by automatically using the information required for user authentication, to perform user authentication with respect to the device, input of the decryption key by the user is not required at the time of reusing the document by using the marking, thereby enabling a simpler operation.

(9) By printing the marking on the sheet, a user operation required for using the marking (time and labor for preparing the marking sheet) can be omitted.

(10) By transmitting the marking by communication means such as an e-mail, the marking can be output to the sheet and used by the user at any place. When the sheet is lost, re-issuance of the marking sheet becomes easy.

(11) When the decryption key input by the user is incorrect at the time of reusing the stored document by using the marking, this matter is output as a log. Accordingly, a document administrator can be informed of illegal use of the document.

(12) When the marking is used to reuse the stored document, if the number of times that the decryption information input by the user is incorrect exceeds a predetermined number of times, the marking is made unavailable. Accordingly, an illegal use by round-robin search of the decryption key can be prevented.

(13) The level of security of the marking and the decryption key used for long time decreases due to leakage. Therefore, the user is prompted to generate new decryption key and marking with respect to the marking past a predetermined period since generated date of the marking generated according to the encrypted marking information, thereby enabling to maintain the level of security.

(14) The level of security of the marking and the decryption key used a plurality of times decreases due to leakage. Therefore, the user is prompted to generate new decryption key and marking with respect to the marking generated according to the encrypted marking information, whose frequency of use exceeds a predetermined number of times, thereby enabling to maintain the level of security.

While embodiments in which the present invention is applied to the MFP have been explained, the present invention is not limited thereto, and can be applied to other image forming apparatuses such as a digital copying machine, a fax machine, and a printer, as well as various image processors such as an image reader that can be connected to the image forming apparatus, or a PC that can be connected to the image reader and the image forming apparatus.

A computer program according to the second embodiment is used by a CPU (computer) that controls the image processor such as the MFP to realize functions as the code-information realizing unit, the storage control unit, the code-information generating unit, the relating unit, the code encrypting unit, the printing unit, the operating unit, and the processing unit, which are functions included in the present invention. By executing the program by the CPU, the effects described above can be achieved.

The computer program can be stored initially in the memory such as the ROM or the HDD. Alternatively, the program can be recorded on a recording medium such as a compact disk (CD)-ROM, a flexible disk, a magneto optical (MO) disk, a CD-recordable (CD-R), a CD-rewritable (CD-RW), a digital versatile disk (DVD)+R, a DVD+RW, a DVD-R, a DVD-RW, or a DVD-RAM, and a nonvolatile recording medium (memory) such as an electronically erasable programmable ROM (EEPROM) or a memory card and provided. The program recorded on the nonvolatile recording medium is installed in the image processor so that the CPU can execute the program, or the CPU reads the program from the nonvolatile recording medium to execute the program, thereby enabling to execute the respective procedures described above.

Further, the program can be downloaded from an external device including a recording medium storing the program or external device in which the program is stored in a storage unit, and executed.

According to an aspect of the present invention, the two-dimensional code information and an input image (document) that can be reused according thereto can be protected from an illegal use by a third party.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor comprising:
a code-information recognizing unit that recognizes code information expressing information of an input image;
a storage control unit that stores the input image in a storage device;
a code-information generating unit that, in response to a notification that the input image has been stored in the storage device received from the storage control unit, generates two-dimensional code information expressing at least one of information relating to storage of the input image, the information relating to the storage of the input image includes at least one of date and time when the input image is stored in the storage device, a storage location in the storage device in which the input image is stored, and a file name of the input image and an output parameters of the input image, the output parameters of the input image includes a printing parameter of the input image;
a code encrypting unit that encrypts the two-dimensional code information generated by the code-information generating unit;
a relating unit that relates the two-dimensional code information generated by the code-information generating unit and the input image stored in the storage device to each other;
a printing unit that prints out the two-dimensional code information generated by the code-information generating unit onto a recording medium;
an operating unit that receives input of two-dimensional code use information for using the two-dimensional code information generated by the code-information generating unit;

a processing unit that retrieves the input image related to the two-dimensional code information recognized by the code-information recognizing unit from the storage device, when corresponding two-dimensional code information becomes available by the two-dimensional code use information input from the operating unit, and performs processing with respect to retrieved input image based on the two-dimensional code information; and a re-encrypting unit that causes the code encrypting unit to encrypt the two-dimensional code information and the operating unit to display the decryption information, when a period has passed since the date and time of generation of the two-dimensional code information by the code-information generating unit.

2. The image processor according to claim 1, wherein the operating unit displays decryption information for decrypting the two-dimensional code information encrypted by the code encrypting unit and receives an input of decryption information, and the processing unit performs retrieval of the input image and processing based on the two-dimensional code information with respect to retrieved input image, when the decryption information received by the operating unit is correct.

3. The image processor according to claim 2, wherein when the decryption information received by the operating unit is incorrect, the processing unit outputs a message indicating that the decryption information is incorrect as a log.

4. The image processor according to claim 3, wherein when number of times that the decryption information received by the operating unit is incorrect exceeds a number of times, the processing unit makes the corresponding two-dimensional code information unavailable.

5. The image processor according to claim 1, wherein the storage device includes a storage unit of the image processor or a computer device.

6. An image processing method comprising:

recognizing, by a processor associated with an image processor, code information expressing information of an input image;

storing the input image in a storage device;

generating, by the processor, in response to completion of storing of the input image in the storage device at the storing, two-dimensional code information expressing at least one of information relating to storage of the input image, the information relating to the storage of the input image includes at least one of date and time when the input image is stored in the storage device, a storage location in the storage device in which the input image is stored, and a file name of the input image and an output parameters of the input image, the output parameters of the input image includes a printing parameter of the input image;

encrypting, by the processor, the two-dimensional code information;

relating, by the processor, the two-dimensional code information generated at the generating and the input image stored in the storage device to each other;

printing out, by the processor, the two-dimensional code information generated at generating onto a recording medium;

receiving, by the processor, input of two-dimensional code use information for using the generated two-dimensional code information;

retrieving, by the processor, the input image related to the two-dimensional code information recognized at the recognizing from the storage device, when corresponding two-dimensional code information becomes available by the two-dimensional code use information received at the receiving, and performing processing with respect to an input image retrieved at the retrieving based on the two-dimensional code information; and re-encrypting, by the processor, the two-dimensional code information and displaying the decryption information, when a period has passed since the date and time of generation of the two-dimensional code information at the generating.

7. The image processing method according to claim 6, further comprising displaying decryption information for decrypting the two-dimensional code information encrypted at the encrypting, wherein the receiving includes receives input of decryption information, and the retrieving includes retrieving the input image and performing processing based on the two-dimensional code information with respect to retrieved input image, when the decryption information received at the receiving is correct.

8. The image processing method according to claim 7, wherein when the decryption information received at the receiving is incorrect, the performing includes outputting a message indicating that the decryption information is incorrect as a log.

9. The image processing method according to claim 8, wherein when number of times that the decryption information received at the receiving is incorrect exceeds a number of times, the performing includes making the corresponding two-dimensional code information unavailable.

10. The image processing method according to claim 6, wherein the storage device includes a storage unit of an image processor or a computer device.

11. A computer program product that includes computer program codes stored on a non-transitory computer-readable recording medium which when executed on a computer causes the computer to execute:

recognizing code information expressing information of an input image;

storing the input image in a storage device;

generating, in response to completion of storing of the input image in the storage device at the storing, two-dimensional code information expressing at least one of information relating to storage of the input image, the information relating to the storage of the input image includes at least one of date and time when the input image is stored in the storage device, a storage location in the storage device in which the input image is stored, and a file name of the input image and an output parameters of the input image, the output parameters of the input image includes a printing parameter of the input image;

encrypting the two-dimensional code information;

relating the two-dimensional code information generated at the generating and the input image stored in the storage device to each other;

printing out the two-dimensional code information generated at generating onto a recording medium;

receiving input of two-dimensional code use information for using the generated two-dimensional code information;

retrieving the input image related to the two-dimensional code information recognized at the recognizing from the storage device, when corresponding two-dimensional code information becomes available by the two-dimensional code use information received at the receiving, and performing processing with respect to an input image retrieved at the retrieving based on the two-dimensional code information; and re-encrypting the two-dimensional code information and displaying the decryption information, when a period has passed since the date and time of generation of the two-dimensional code information at the generating.

12. An image processor comprising:

a code-information recognizing unit that recognizes code information expressing information of an input image;

a storage control unit that stores the input image in a storage device;

a code-information generating unit that, in response to a notification that the input image has been stored in the storage device received from the storage control unit, generates two-dimensional code information expressing at least one of information relating to storage of the input image, the information relating to the storage of the input image includes at least one of date and time when the input image is stored in the storage device, a storage location in the storage device in which the input image is stored, and a file name of the input image and an output parameters of the input image, the output parameters of the input image includes a printing parameter of the input image;

a code encrypting unit that encrypts the two-dimensional code information generated by the code-information generating unit;

a relating unit that relates the two-dimensional code information generated by the code-information generating unit and the input image stored in the storage device to each other;

a printing unit that prints out the two-dimensional code information generated by the code-information generating unit onto a recording medium;

an operating unit that receives input of two-dimensional code use information for using the two-dimensional code information generated by the code-information generating unit;

a processing unit that retrieves the input image related to the two-dimensional code information recognized by the code-information recognizing unit from the storage device, when corresponding two-dimensional code information becomes available by the two-dimensional code use information input from the operating unit, and performs processing with respect to retrieved input image based on the two-dimensional code information; and a re-encrypting unit that causes the code encrypting unit to encrypt the two-dimensional code information and the operating unit to display the decryption information, when number of times of use of the two-dimensional code information generated by the code-information generating unit exceeds a number of times.

13. The image processor according to claim 12, wherein the operating unit displays decryption information for decrypting the two-dimensional code information encrypted by the code encrypting unit and receives an input of decryption information, and the processing unit performs retrieval of the input image and processing based on the two-dimensional code information with respect to retrieved input image, when the decryption information received by the operating unit is correct.

14. The image processor according to claim 13, wherein when the decryption information received by the operating unit is incorrect, the processing unit outputs a message indicating that the decryption information is incorrect as a log.

15. The image processor according to claim 14, wherein when number of times that the decryption information received by the operating unit is incorrect exceeds a number of times, the processing unit makes the corresponding two-dimensional code information unavailable.

16. The image processor according to claim 12, wherein the storage device includes a storage unit of the image processor or a computer device.

17. An image processing method comprising:

recognizing, by a processor associated with an image processor, code information expressing information of an input image;

storing the input image in a storage device;

generating, by the processor, in response to completion of storing of the input image in the storage device at the storing, two-dimensional code information expressing at least one of information relating to storage of the input image, the information relating to the storage of the input image includes at least one of date and time when the input image is stored in the storage device, a storage location in the storage device in which the input image is stored, and a file name of the input image and an output parameters of the input image, the output parameters of the input image includes a printing parameter of the input image;

encrypting, by the processor, the two-dimensional code information;

relating, by the processor, the two-dimensional code information generated at the generating and the input image stored in the storage device to each other;

printing out, by the processor, the two-dimensional code information generated at generating onto a recording medium;

receiving, by the processor, input of two-dimensional code use information for using the generated two-dimensional code information;

retrieving, by the processor, the input image related to the two-dimensional code information recognized at the recognizing from the storage device, when corresponding two-dimensional code information becomes available by the two-dimensional code use information received at the receiving, and performing processing with respect to an input image retrieved at the retrieving based on the two-dimensional code information; and re-encrypting, by the processor, the two-dimensional code information and displaying the decryption information, when number of times of use of the two-dimensional code information generated at the generating exceeds a number of times.

18. The image processing method according to claim 17, further comprising displaying decryption information for decrypting the two-dimensional code information encrypted at the encrypting, wherein the receiving includes receives input of decryption information, and the retrieving includes retrieving the input image and performing processing based on the two-dimensional code information with respect to retrieved input image, when the decryption information received at the receiving is correct.

19. The image processing method according to claim 18, wherein when the decryption information received at the receiving is incorrect, the performing includes outputting a message indicating that the decryption information is incorrect as a log.

20. The image processing method according to claim 19, wherein when number of times that the decryption information received at the receiving is incorrect exceeds a number of times, the performing includes making the corresponding two-dimensional code information unavailable.

21. The image processing method according to claim 17, wherein the storage device includes a storage unit of an image processor or a computer device.

22. A computer program product that includes computer program codes stored on a non-transitory computer-readable recording medium which when executed on a computer causes the computer to execute:

recognizing code information expressing information of an input image;

storing the input image in a storage device;

generating, in response to completion of storing of the input image in the storage device at the storing, two-dimensional code information expressing at least one of information relating to storage of the input image, the information relating to the storage of the input image includes at least one of date and time when the input image is stored in the storage device, a storage location in the storage device in which the input image is stored, and a file name of the input image and an output parameters of the input image, the output parameters of the input image includes a printing parameter of the input image;

encrypting the two-dimensional code information;

relating the two-dimensional code information generated at the generating and the input image stored in the storage device to each other;

printing out the two-dimensional code information generated at generating onto a recording medium;

receiving input of two-dimensional code use information for using the generated two-dimensional code information;

retrieving the input image related to the two-dimensional code information recognized at the recognizing from the storage device, when corresponding two-dimensional code information becomes available by the two-dimensional code use information received at the receiving, and performing processing with respect to an input image retrieved at the retrieving based on the two-dimensional code information; and re-encrypting the two-dimensional code information and displaying the decryption information, when number of times of use of the two-dimensional code information generated at the generating exceeds a number of times.

* * * * *